United States Patent
Statia et al.

(10) Patent No.: US 10,372,484 B2
(45) Date of Patent: Aug. 6, 2019

(54) SECURED COMPUTING SYSTEM

(71) Applicant: Microsoft Technology Licensing, LLC, Redmond, WA (US)

(72) Inventors: Jeromy Scott Statia, Duvall, WA (US); Brad Turner, Sammamish, WA (US); George Ringer, Mercer Island, WA (US); Alexandr Tcherniakhovski, Sammamish, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 240 days.

(21) Appl. No.: 15/194,345

(22) Filed: Jun. 27, 2016

(65) Prior Publication Data
US 2017/0371702 A1   Dec. 28, 2017

(51) Int. Cl.
| G06F 9/46 | (2006.01) |
| G06F 9/48 | (2006.01) |
| H04L 29/06 | (2006.01) |

(52) U.S. Cl.
CPC .............. *G06F 9/48* (2013.01); *G06F 9/4843* (2013.01); *H04L 63/0442* (2013.01); *H04L 63/101* (2013.01); *H04L 63/12* (2013.01); *H04L 63/083* (2013.01); *H04L 63/123* (2013.01)

(58) Field of Classification Search
None
See application file for complete search history.

(56) References Cited

U.S. PATENT DOCUMENTS

| 5,235,642 | A | 8/1993 | Wobber et al. |
| 6,067,623 | A | 5/2000 | Blakley, III et al. |
| 6,199,113 | B1 | 3/2001 | Alegre et al. |
| 7,487,348 | B2 * | 2/2009 | Kroening ............... H04L 63/08 |
| | | | 713/150 |
| 7,913,084 | B2 | 3/2011 | Medvinsky et al. |
| 8,239,868 | B2 | 8/2012 | Misono et al. |
| 8,510,818 | B2 | 8/2013 | Garg et al. |
| 8,881,257 | B2 | 11/2014 | Cha et al. |
| 8,914,866 | B2 | 12/2014 | Kontsevich |
| 9,258,118 | B1 | 2/2016 | Roth et al. |
| 2002/0023122 | A1 * | 2/2002 | Polizzi .............. G06F 17/30873 |
| | | | 709/202 |

(Continued)

OTHER PUBLICATIONS

Chong, Frederick, "Trusted Subsystem Design", Published on: Sep. 2006 Available at: https://msdn.microsoft.com/en-us/library/aa905320.aspx.

*Primary Examiner* — Dong U Kim
(74) *Attorney, Agent, or Firm* — Alleman Hall Creasman & Tuttle LLP

(57) ABSTRACT

Examples related to secure computing systems are disclosed. In one example, a method includes, at a local agent computing device, sending to a remote work scheduling computing device a work context of the local agent computing device, the work context describing a set of work that the local agent is configured to execute, and polling a remote work depository for work compatible with the work context. The method further includes receiving a response from the remote work depository identifying a job within the work context, the job being requested by a computing device other than the remote work scheduling computing device, and executing the job.

20 Claims, 6 Drawing Sheets

(56) References Cited

U.S. PATENT DOCUMENTS

| | | | | |
|---|---|---|---|---|
| 2003/0046589 | A1* | 3/2003 | Gregg | G06F 21/335 |
| | | | | 726/5 |
| 2005/0283782 | A1* | 12/2005 | Lu | G06F 9/5072 |
| | | | | 718/100 |
| 2006/0017953 | A1* | 1/2006 | Ly | G06F 3/1207 |
| | | | | 358/1.13 |
| 2006/0230405 | A1* | 10/2006 | Fraenkel | G06F 9/5027 |
| | | | | 718/104 |
| 2006/0288097 | A1* | 12/2006 | Sorrentino | G06F 3/1207 |
| | | | | 709/224 |
| 2007/0277231 | A1* | 11/2007 | Medvinsky | H04L 63/0815 |
| | | | | 726/5 |
| 2007/0283355 | A1* | 12/2007 | Misono | G06F 9/505 |
| | | | | 718/102 |
| 2008/0141261 | A1* | 6/2008 | Machida | G06F 11/3495 |
| | | | | 718/104 |
| 2012/0023558 | A1* | 1/2012 | Rafiq | H04L 63/08 |
| | | | | 726/6 |
| 2012/0254277 | A1 | 10/2012 | Ho et al. | |
| 2014/0044259 | A1* | 2/2014 | Funayama | G06F 21/602 |
| | | | | 380/243 |
| 2015/0082317 | A1* | 3/2015 | You | G06F 9/5094 |
| | | | | 718/104 |
| 2016/0021092 | A1 | 1/2016 | Samson et al. | |
| 2017/0132331 | A1* | 5/2017 | Pepakayala | G06F 17/30528 |

* cited by examiner

SECURED COMPUTING SYSTEM

BACKGROUND

In many secured computing architectures, client devices that request work are isolated from agent devices that perform work. An orchestrator device, for example, may mediate client-agent device interaction by instructing agent devices to execute validated work requests issued by clients. To this end, the orchestrator may store credentials for logging into an agent device with administrative access.

SUMMARY

Examples are disclosed that relate to secured computing architectures. One example provides a method comprising, at a local agent computing device, sending to a remote work scheduling computing device a work context of the local agent computing device, the work context describing a set of work that the local agent is configured to execute, and polling a remote work depository for work compatible with the work context. The method may further comprise receiving a response from the remote work depository identifying a job within the work context, the job being requested by a computing device other than the remote work scheduling computing device, and executing the job.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

As described above, in secured computing architectures, an orchestrator device may mediate client-agent device interaction by instructing agent devices to execute validated work requests issued by clients. To this end, the orchestrator device may store credentials for logging into agent devices, which may provide administrative access to the agent devices. If unauthorized access to the orchestrator device is obtained, unauthorized access to any downstream agent devices for which credentials are stored on the orchestrator device also may be obtained. Further, if a credential enables access to a group of agent devices, unauthorized access to the entire group may be obtained by stealing the credential from merely one of the agent devices. Unauthorized access to networks configured in this manner may thus be obtained by leveraging a single point of compromise.

Accordingly, examples are disclosed that relate to secured computing systems in which agent devices poll a work depository for work compatible with their work context, as opposed to architectures in which an orchestrator device controls the execution of work by accessing agent devices with administrative privileges. As described in further detail below, a work context may describe a set of work that a local agent is configured to execute, and for which the local agent may poll a remote work depository. A remote work scheduling computing device that is intermediate a requesting client and an agent device may receive and validate client work requests, and deposit signed work requests in the remote work depository for discovery by authorized local agents (e.g., agents whose work contexts are compatible with the deposited, signed work requests and that have published their work contexts to the remote work scheduling device and/or the work depository to perform such work). Such publication also may be referred to as registration. Local agent devices then may poll the work depository periodically for jobs in their respective work contexts. This may help to avoid storing login credentials for agents at another device such as an orchestrator device (or another agent device in the secured computing system), and thus may help to reduce the risks posed by the compromise of such an orchestrator device. The disclosed examples also may simplify the tasks performed by the work scheduling computing device and other devices in the system compared to a system with an orchestrator device that remotely logs into and controls other computing devices, and thereby may simplify and improve operation of the devices within the system. These and other features are discussed in more detail below.

Figure 1:
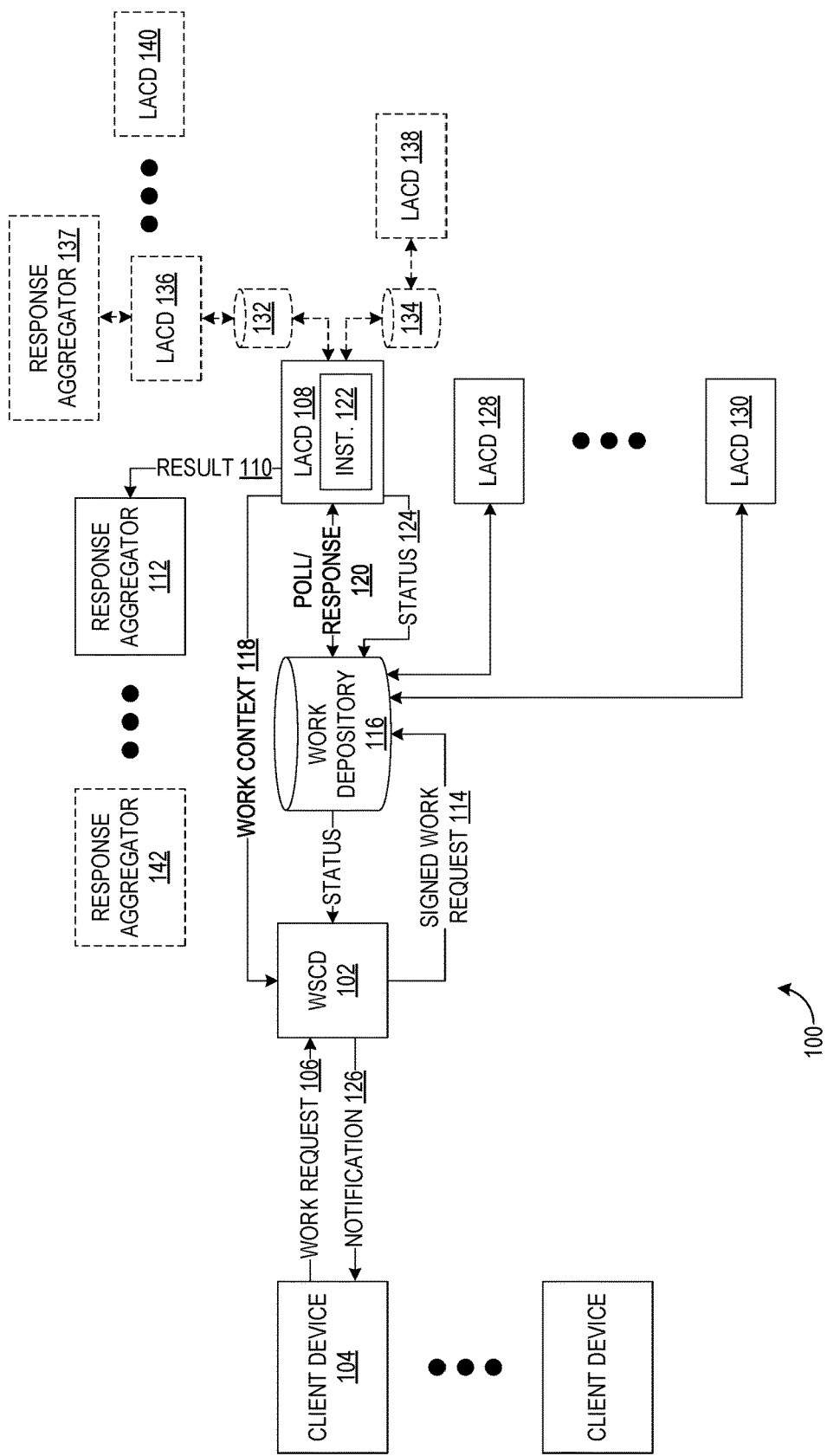
FIG. 1 schematically shows a block diagram depicting an architecture of an example secured computing system.

FIG. 1 schematically shows a block diagram depicting an architecture of an example secured computing system 100. Computing system 100 comprises one or more client devices 104 that may request the performance of work by submitting work requests 106 to a work scheduling computing device (WSCD) 102. Work request 106 may comprise any suitable type of work request. Examples include secured financial transactions (e.g., credit/debit card purchases), personally identifiable information processing (e.g., retrieval of, and/or update to, healthcare or financial information), and modifications of devices within computing system 100 (e.g. patches for agent devices). As described in further detail below, WSCD 102 may make successfully validated work requests available for discovery by authorized local agent computing devices (LACDs), which can selectively perform work compatible with their configuration.

FIG. 1 shows client device 104 submitting a work request to WSCD 102. Upon receipt, WSCD validates the work request 106 to determine that the work request is authorized. Validating work request 106 may include validating one or more of a user of client device 104, the client device 104 itself, and/or a type and/or content of the work request. Validating the user may comprise evaluating one or more properties of the user, such as identity, account credentials (e.g., username, password), group membership, roles, privileges/capabilities, etc. In some examples, work request 106 may include a security token comprising one or more claims. The one or more claims may include information regarding one or more of the user properties described above, encryption keys, and/or any other suitable information. Client device 104 may provide the security token, for example, via an authorization layer), or a remote issuer (not shown in FIG. 1) may provide the security token.

Validating the client device 104 may include validating network properties (e.g., network location and/or identity), hardware configuration, software configuration, and/or other aspects of the client device. Validating the type and/or content of work request 106 may include, for example, comparing the work request type with work request types for which the submitting user is authorized to request (e.g., by evaluating claims in the work request). If the type of work request 106 is a type that the user is authorized to request, WSCD 102 may validate the work request. Likewise, WSCD 102 may not validate work request 106 if the user is not authorized for that work type. By validating work requests at WSCD 102, the issuance of malicious work requests or malicious code therein can be mitigated, limiting the propagation of malicious activity throughout computing system 100.

In response to determining that work request 106 is authorized, WSCD 102 encrypts the work request to form a signed work request 114 and deposits the signed work request in a work depository 116 for discovery by an authorized LACD. In the example of FIG. 1, LACD 108 is authorized to discover signed work request 114 and execute the type of work specified by the work request, as the type of the signed work request is compatible with a work context 118 of the LACD, wherein the work context of an LACD describes a set of work that the LACD is configured to execute. As such, the LACD may be unable to perform work that is not within its work context.

LACDs may describe work contexts 118 to WSCD 102 in a publication process that enables dynamic scalability of LACDs and work contexts in computing system 100. In response to receiving work context 118, WSCD 102 may provide to LACD 108 a location (e.g., network address) of work depository 116 where work compatible with the work context can be deposited for LACD discovery. As described in further detail below, work depository 116 may be specifically established to store signed work requests compatible with work context 118, and may be established in response to receipt of the work context from an LACD or prior thereto. LACD 108 then may poll work depository 116 for work compatible with work context 118, and receive from the work depository a response 120 to the polling query (e.g., via WSCD 102) identifying any pending jobs within the work context. As used herein, a 'job' within a work context may refer to any work specified in a work request. The set of available work contexts that can be performed by WSCD 102 may be provided to client device 104 by WSCD 102, for example upon receiving from client device 104 a request for the set of available work contexts.

Various security mechanisms may be used to enforce LACD work contexts. As one example, signed work request 114 may be encrypted with a first key of a key pair that is specific to work context 118 of the LACD 108. To execute a job specified in the work request, LACD 108 may decrypt the work request using a second key of the key pair. The first key may be a private key, and the second key may be a public key, or the first may be public and the second private. In either case, respective key pairs may be used for each work context in computing system 100, so that LACDs not authorized for a particular work context cannot execute jobs without possessing the corresponding decryption key, thereby logically separating work contexts by encryption. Other mechanisms of logically separating work contexts are possible, including but not limited to providing respective partitions on a storage device for each context, and/or delegating respective addressable storage locations for each context. Alternatively or additionally, work contexts may be physically separated—e.g., by providing different storage devices at different physical network locations for each work context.

LACD 108 may attempt to execute the job after decrypting the job. In some implementations, work requests in system 100 may specify one or more parameters for execution, as opposed to executable instructions for executing the job. As such, instructions for executing jobs within work contexts for which LACDs are configured may be stored locally on those LACDs. As an example, FIG. 1 shows the local storage on LACD 108 of instructions 122 for executing the job specified by work request 106. By specifying parameters in the work request, rather than executable job code, arbitrary code execution at LACDs may be prevented, which may help to prevent the execution of malicious code. Further, measures may be taken to prohibit unauthorized modifications of local LACD instructions, e.g., by signing the local LACD instructions.

Executing a job may include attempting to validate one or more parameters specified by that job. Parameter validation may be performed in any suitable manner, which may be a function of the parameters and/or job type. As an example of a parameter that may be validated, LACD 108 may be configured to perform local software patches via instructions 122. In this instance, the instructions may first validate the patch, and then write the patch to LACD 108 after validation. It will be understood that instruction 122 does not actually execute the patch itself. In response to successfully validating the one or more parameters specified by a job, LACD 108 may execute the job, whereas the LACD may not execute the job in response to failing to validate the one or more parameters. In some examples, LACD 108 may send a status 124 to work depository 116 indicating success or failure of parameter validation. Status 124 may be relayed from work depository 116 to WSCD 102 as shown in FIG. 1. In other examples, however, LACD 108 may not send status 124 to work depository 116, for example if reporting of the status is considered insecure. In yet other examples, a pathway not shown in FIG. 1 may be provided for sending statuses from LACD 108 (e.g., to WSCD 102) that does not route through work depository 116.

WSCD 102 may relay the status of a job to client devices by accessing work depository 116 for statuses and sending notifications indicating the status. For example, FIG. 1 shows a notification 126 transmitted from WSCD 102 to client device 104 indicating the execution status of the job identified in response 120. Notification 126 may relay any suitable status information, such as an indication that job execution has started, an indication of job progress, an indication of execution failure, and/or an indication of job completion. In some examples, notification 126 may be pushed to client device 104 upon availability, while in other examples the client device may poll WSCD 102 for available job statuses. In some examples, computing system 100 may enable client device 104 to cancel requested jobs and/or to reschedule jobs (e.g., in response to failure of a previously requested job).

Some jobs performed by LACD 108 may produce a result for client device 104. In such an instance, upon receipt of a job completion status message from LACD 108, WSCD 102 may send a notification 126 identifying a location of result 110 of completing the job so that client device 104 can obtain result 110. In the example depicted in FIG. 1, notification 126 indicates that response aggregator 112 is the resident location of result 110, which is transmitted to the response aggregator from LACD 108. Result 110 may take any suitable form, such as a file or other data structure. Computing system 100 may be configured such that results cannot be obtained from other points in the computing system other than response aggregator 112. This may provide further security for other devices within the computing system 100. In some examples, alternative or additional security measures may be taken to protect result 110 from unauthorized access, such as by encrypting the result with a key that is specific to an aspect of client device 104 (e.g., using a key included in work request 106). Further, in some examples, a plurality of response aggregators may be used, as described below.

FIG. 1 illustrates computing system 100 as including multiple parallel LACDs, shown as a first LACD 108, a second LACD 128, and an nth LACD 130, where n is any suitable integer. In addition, computing system 100 also may include other work depositories, which may be established for work contexts other than work context 118. In other examples, work requests of different work contexts may be provided to a same work depository. As such, an LACD may describe two or more work contexts to WSCD 102, and may execute jobs within the two or more work contexts. LACD scaling may be implemented in any suitable manner, such as by selectively registering and deregistering LACDs to work depositories at WSCD 102.

In some examples, one or more LACDs may be configured to delegate or distribute jobs to other LACDs for execution, such that LACDs are logically arranged in series. Referring to FIG. 1, LACD 108 may divide a job into a plurality of subtasks. LACD 108 may then deposit each subtask in a respective depository established for the work context of that subtask for discovery by a downstream LACD configured for the work context of that subtask. Example work depositories are illustrated as work depository 132 for subtasks of a first work context and a second work depository 134 for subtasks of a second work context. LACDs such as a first downstream LACD 136 and a second downstream LACD 138 may poll first and second work depositories 132 and 134, respectively, for jobs. An LACD in computing system 100 may divide jobs into subtasks for any suitable reason, such as to increase job throughput by distributing subtasks and/or to meet security conditions by compartmentalizing subtask execution. Further, status messages may be passed to LACD 108 from LACDs 136, 138.

The series implementation of LACDs in computing system 100 described above may be extended to suitable number of LACD layers, as indicated by LACD 140, which is an arbitrary number of layers beneath LACD 136, and each higher layer may be configured to operate as described for LACD 108, while each lower layer may be configured to operate as described for LACDs 136, 138. To enable work aggregation across layers and/or the formation of a result from constituent results, suitable labels such as tags may be transmitted with subtasks that identify the relation of jobs of different level residencies. Further, in some examples response aggregator 112 may store received results according to the layer in which they were generated, and may aggregate results across multiple layers to provide an aggregated result for a client.

In other examples, respective response aggregators may be provided for each layer, as illustrated by response aggregator 137 for LACD 136. When results corresponding to a common work request are distributed across response aggregators in two or more different layers, the LACD that distributed subtasks to a lower layer of LACDs may access the response aggregators for the lower layer of LACDs, or a client may access the individual results from the lower layer LACDs. Likewise, in some examples, respective response aggregators may be provided for each work context in computing system 100. FIG. 1 shows an example nth response aggregator 142, which may represent a response aggregator provided for an LACD layer other than that for which response aggregator 112 is provided, and/or provided for a work context (in a same layer or different layer) other than that for which response aggregator 112 is provided.

In view of the above, computing system 100 comprises multiple security features that may help to prevent one device within computing system 100 from being compromised by an attack on another. For example, having LACDs poll a work repository (or repositories) for jobs allows the omission of an orchestrator device that controls work performed on other devices and/or stores credentials for those devices. Thus, unauthorized access to LACDs cannot be obtained by leveraging credentials for those local agents stored on such an orchestrator device (e.g., as local agent credentials are not stored on WSCD 102 or otherwise used to remotely log in to local agents). Further, as local agents perform work according to their local work context, they cannot discover work outside of the context. Additionally, as jobs obtained from the work repository contain parameters, but not code executable during the job, the execution of malicious code by an agent may be avoided. Further, validation/authentication procedures may be used at various stages in the system for additional security.

Figure 2A:
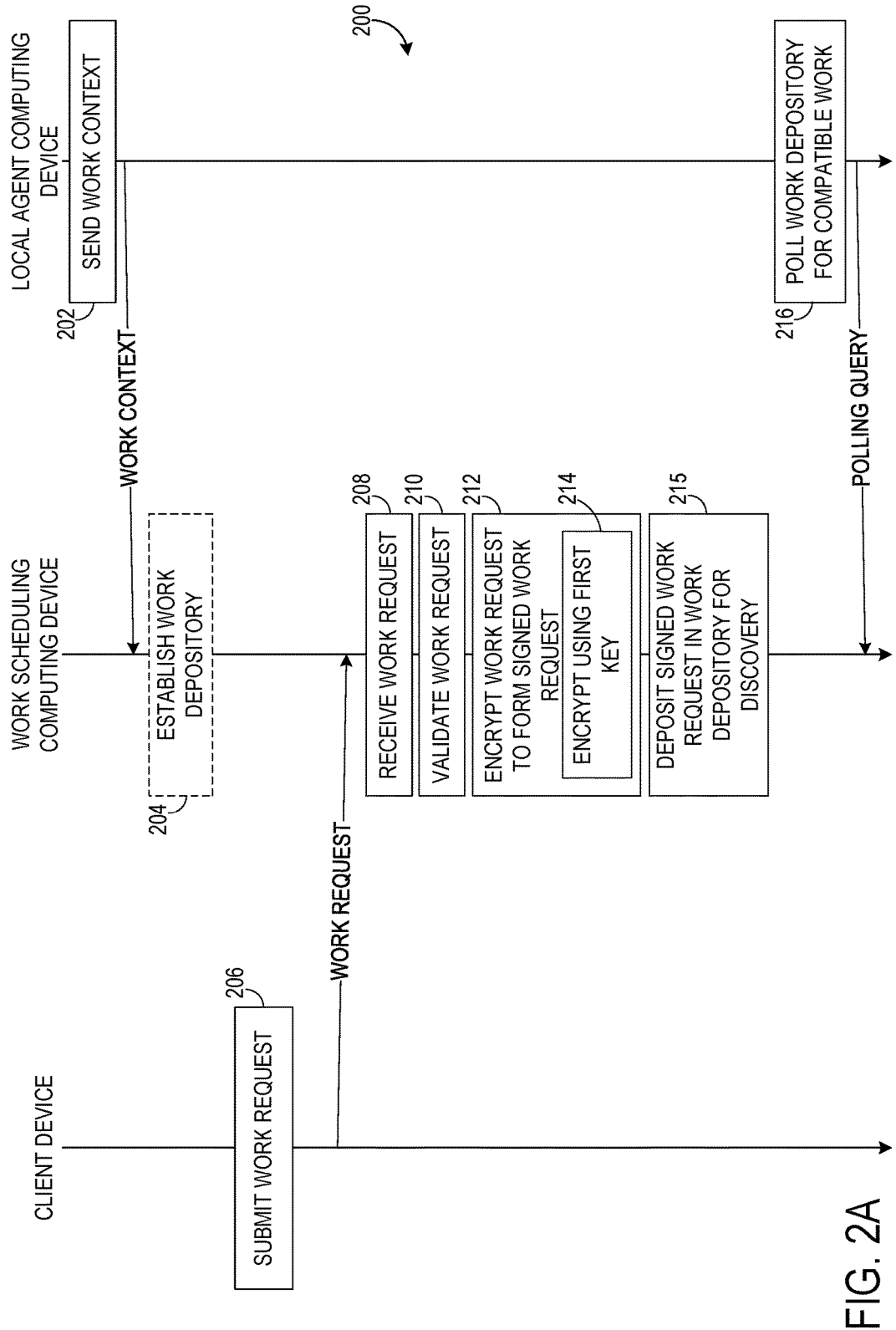
FIGS. 2A-2C show a flow diagram illustrating an example method of implementing a secured computing system.
Figure 2B:
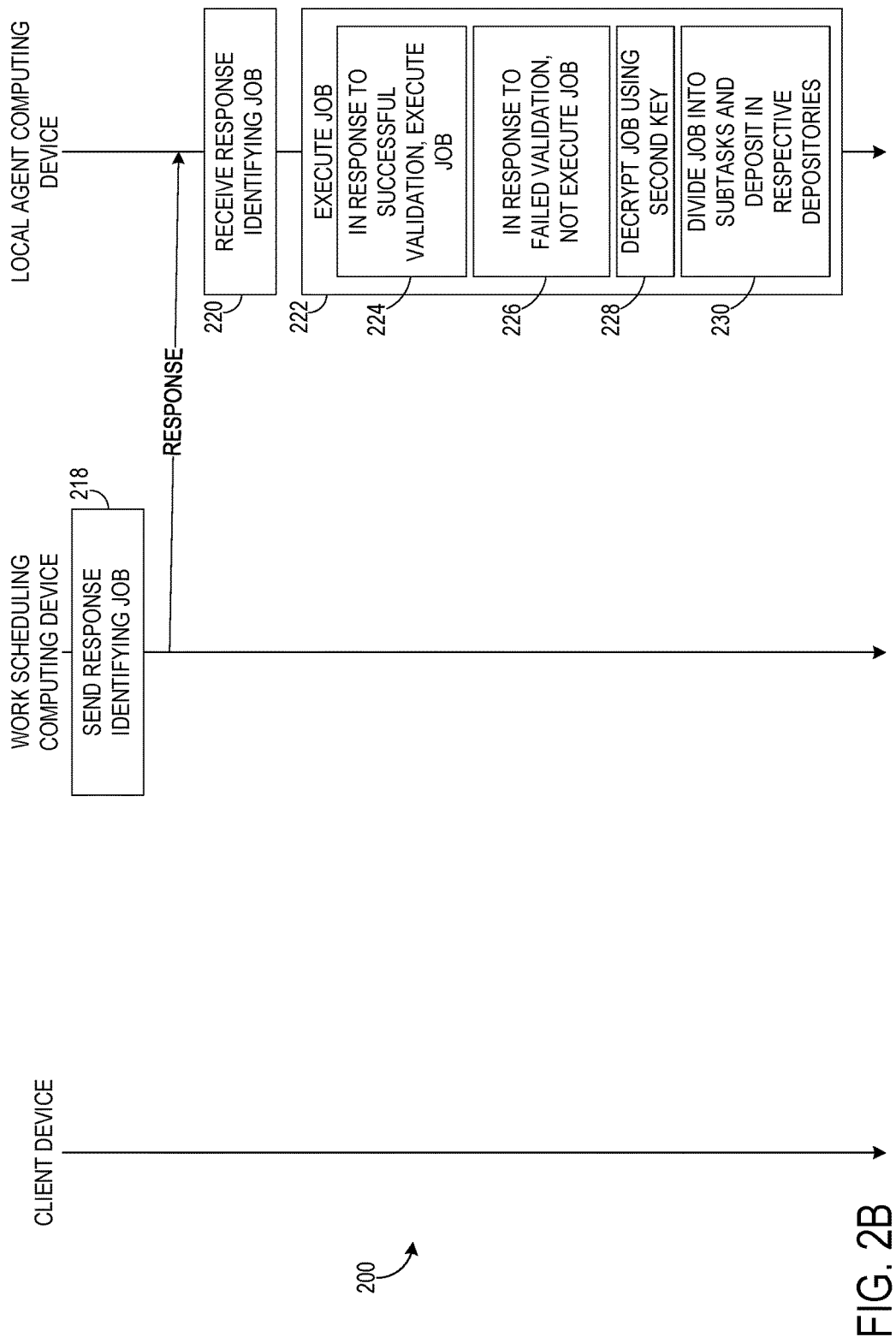
Figure 2C:
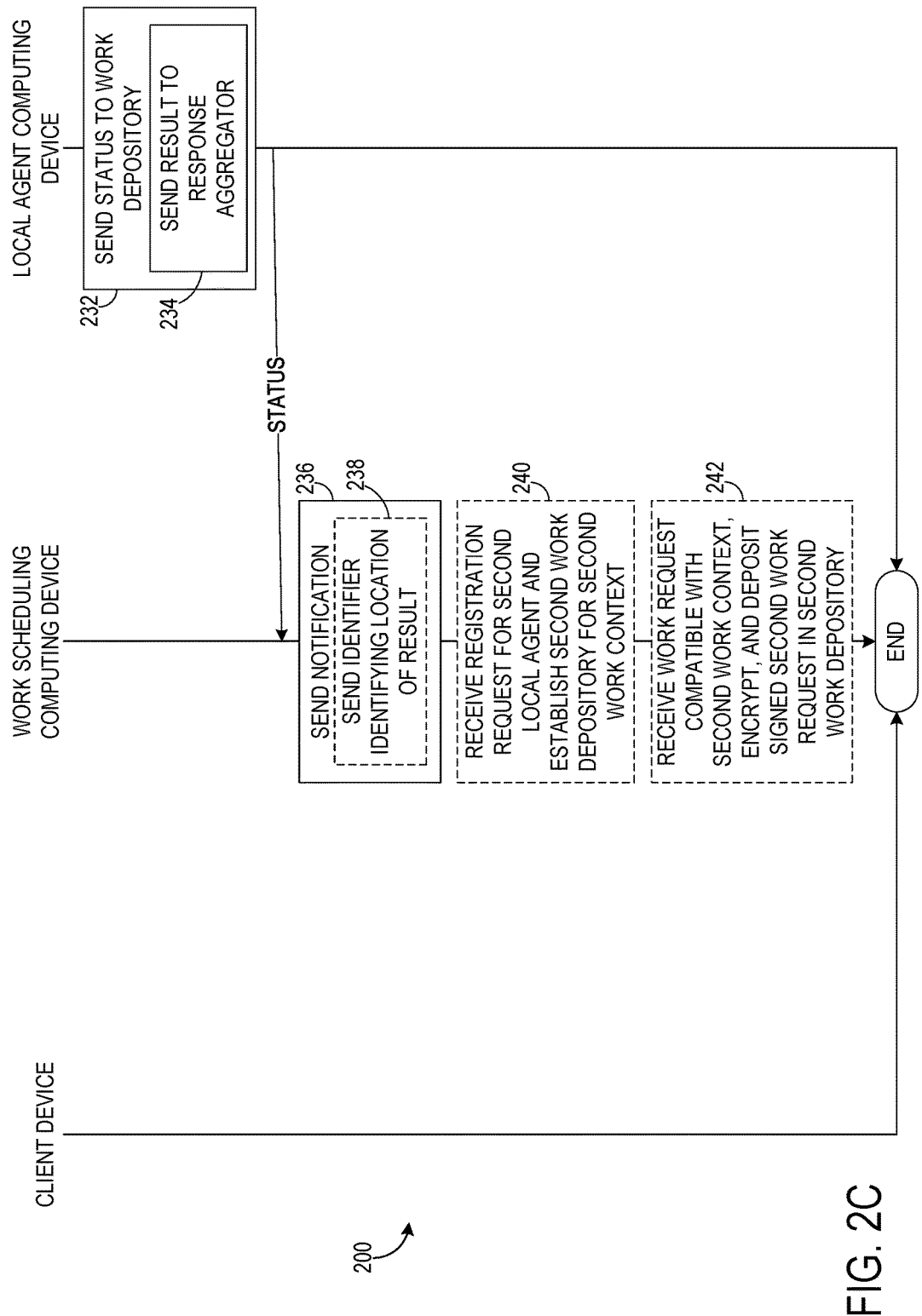

FIGS. 2A-2C show a flow diagram illustrating an example method 200 of implementing a secured computing system. Method 200 may be carried out in computing system 100, for example. As such, references to FIG. 1 are made throughout the description of method 200.

At 202, method 200 includes, sending a work context from an LACD to a WSCD, wherein the work context describes the set of work that the LACD is configured to execute. In some examples, sending the work context may include sending an allowable set of parameters for the work context and actions required to validate the set of parameters. The WSCD may receive the work context from the LACD, and in response, may optionally establish a work depository for the work context at 204 (if not yet established). In other scenarios, the work depository may have been established for the work context prior to the reception of the work context from the LACD. Further, in some examples, the work depository may be established in response to the WSCD authorizing the LACD to execute work within the work context, where the work depository may not be established if the LACD cannot be authorized. Authorization may further include authorizing the allowable set of parameters for the work context and the actions required to validate the set of parameters. The WSCD may be configured to automatically authorize the LACD if the work context (e.g., and other LACD properties) are determined to be valid, or authorization may be carried out manually via user input approving the authorization.

At 206, method 200 includes submitting a work request from a client device. The client device may be client device 104, and the work request may be work request 106, for example. The work request may include a security token comprising one or more claims (e.g., regarding user credentials, privileges, memberships), and/or any other suitable information. At 208, method 200 includes receiving the work request at the WSCD, and at 210, validating the work request at the WSCD. Validating the work request may include, for example, validating aspects of the client device from which it was submitted, validating a user that submitted the request, and/or validating a type of the work requested. Upon validation, at 212, method 200 includes encrypting the work request to form a signed work request. Encrypting the work request may include, at 214, encrypting the work request using a first key of a key pair that is specific to the work context of the work request. A second key of the key pair may be used to decrypt the signed work request at the LACD. At 215, method 200 includes depositing the signed work request in the work depository for discovery by an authorized LACD. The signed work request may be signed work request 114, for example. On the other hand, if the work request cannot be validated, then the WSCD may not encrypt/sign/deposit the work request.

At 216, method 200 includes polling, at the LACD, the work depository for work compatible with the work context of the LACD (e.g., the work context sent at 202). The WSCD may receive the polling query for compatible work from the LACD, and in response, may send, at 218, a response identifying a job within the work context. The response may be response 120, for example. At 220, method 200 includes receiving receive the response identifying the job at the LACD, and at 222, executing the job at the LACD. Executing the job may include attempting to validate one or more parameters specified by the job. At 224, method 200 may include, in response to successfully validating the one or more parameters, executing the job, or at 226, in response to failing to validate the one or more parameters, not executing the job. Executing the job may include, at 228, decrypting the job using the second key of the key pair specific to the work context of the LACD, and at 230, dividing the job into a plurality of subtasks each associated with a different work context and depositing each subtask in a depository for the work context of that subtask for discovery by an LACD configured for the work context of that subtask. For example, LACD 108 may divide the job identified in response 120 into first and second subtasks and deposit the subtasks in work depositories 132 and 134, respectively, for respective discovery by LACDs 136 and 138. In other examples, the job may not be divided into subtasks, but rather may be performed in full on the LACD.

At 232, method 200 includes sending a status from the LACD to the work depository indicating an execution status of the job. The status may indicate that the job has been completed, failed, is in progress, is stalled, or may indicate any other suitable information. Method 200 further may include, at 234, sending a result of completing the job to a remote response aggregator. The response aggregator may be response aggregator 112, for example. The WSCD receives the status, and at 236, may send a notification to the client device indicating completion of the work request. Sending the notification may include, at 238, sending an identifier identifying a location of the result of completing the work request. The location may correspond to the remote response aggregator, for example. At 240, method 200 may optionally include receiving a registration request for a second LACD, and in response to receiving the registration request, establishing a second work depository for a second work context of the second LACD. At 242, method 200 may optionally include receiving a work request compatible with the second work context, encrypting the second work request to form a signed second work request, and depositing the signed second work request in the second work depository.

Figure 3:
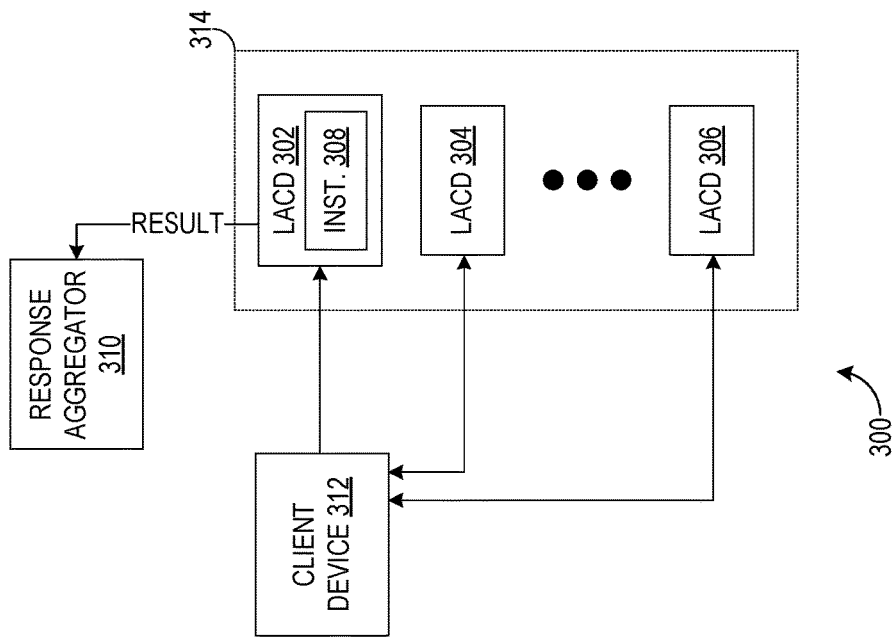
FIG. 3 schematically shows a block diagram depicting an architecture of another example secured computing system.

FIG. 3 schematically shows a block diagram depicting an architecture of another example secured computing system 300. In contrast to computing system 100 (FIG. 1), client devices in computing system 300 may issue work requests directly to one or more LACDs, rather than to a WSCD. As such, client-agent interaction in computing system 300 is not mediated by a WSCD.

In computing system 300, one or more LACDs (e.g., LACDs 302, 304, 306) may execute work locally according to a work context that may be applied to computing system 300 (e.g., to all LACDs in the computing system), or that is specific to a network service context. Local instructions, such as instructions 308, may be used to execute work according to parameters specified in work requests. Results of completing work may be routed from the LACDs to a response aggregator 310 that is remote from the LACDs and from a client device 312, which may issue work requests to the LACDs.

As one example, a requester (e.g., administrator) may deploy a scheduled task or service to LACDs within a network boundary 314 (e.g., ring, fence, other service specific boundary). The process may run as either a local system or a network service and may be a member of a domain security group including all of the computing device accounts relevant to network boundary 314. This group may be delegated the rights to contribute data to response aggregator 310 (e.g., web service aggregator, central file server). Computing system 300 may facilitate secured computing, as neither shared credentials nor broad administrative span of control across is required.

In some embodiments, the methods and processes described herein may be tied to a computing system of one or more computing devices. In particular, such methods and processes may be implemented as a computer-application program or service, an application-programming interface (API), a library, and/or other computer-program product.

Figure 4:
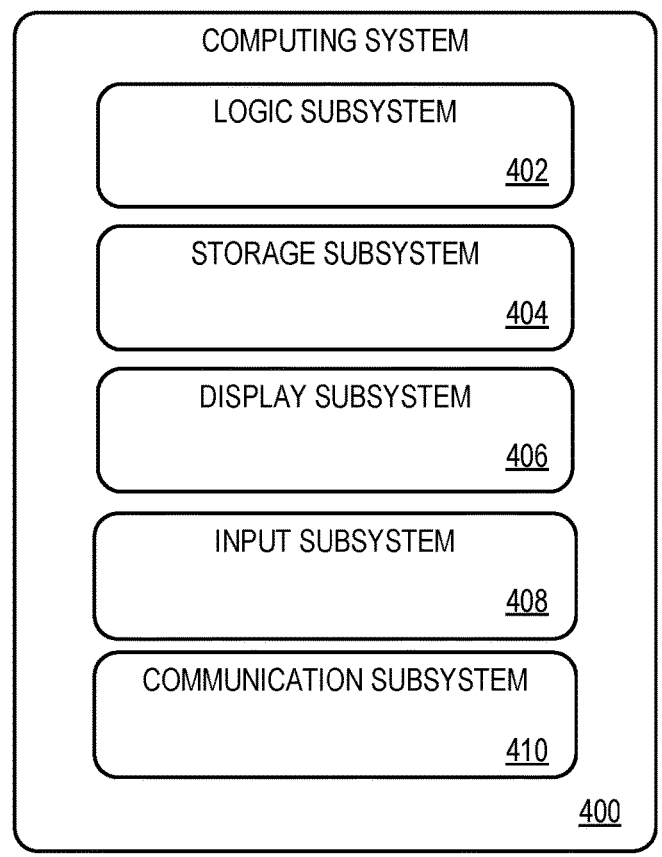
FIG. 4 shows a block diagram of an example computing system.

FIG. 4 schematically shows a non-limiting embodiment of a computing system 400 that can enact one or more of the methods and processes described above. Computing system 400 is shown in simplified form. Computing system 400 may take the form of one or more personal computers, server computers, tablet computers, home-entertainment computers, network computing devices, gaming devices, mobile computing devices, wearable computing devices, and mobile communication devices (e.g., smart phone). Computing system 400 may represent WSCD 102, client devices 104, 312, LACDs 108, 128, 130, 136, 138, 140, 302, 304, 306, response aggregators 112, 310, and/or other computing devices described herein. Computing system 400 further may be implemented in the context of an internet of things (IoT) implementation deployment across multiple independent computing devices that each enact at least a portion of the computing device functions described herein.

Computing system 400 includes a logic machine 402 and a storage machine 404. Computing system 400 may optionally include a display subsystem 406, input subsystem 408, communication subsystem 410, and/or other components not shown in FIG. 4.

Logic machine 402 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 404 includes one or more physical devices configured to hold instructions executable by the logic machine to implement the methods and processes described herein. When such methods and processes are implemented, the state of storage machine 404 may be transformed—e.g., to hold different data.

Storage machine 404 may include removable and/or built-in devices. Storage machine 404 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 404 may include volatile, nonvolatile, dynamic, static, read/write, read-only, random-access, sequential-access, location-addressable, file-addressable, and/or content-addressable devices.

It will be appreciated that storage machine 404 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 402 and storage machine 404 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The term "program" may be used to describe an aspect of computing system 400 implemented to perform a particular function. In some cases, a program may be instantiated via logic machine 402 executing instructions held by storage machine 404. It will be understood that different programs may be instantiated from the same application, service, code block, object, library, routine, API, function, etc. Likewise, the same program may be instantiated by different applications, services, code blocks, objects, routines, APIs, functions, etc. The term "program" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 406 may be used to present a visual representation of data held by storage machine 404. This visual representation may take the form of a graphical user interface (GUI). As the herein described methods and processes change the data held by the storage machine, and thus transform the state of the storage machine, the state of display subsystem 406 may likewise be transformed to visually represent changes in the underlying data. Display subsystem 406 may include one or more display devices utilizing virtually any type of technology. Such display devices may be combined with logic machine 402 and/or storage machine 404 in a shared enclosure, or such display devices may be peripheral display devices.

When included, input subsystem 408 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 410 may be configured to communicatively couple computing system 400 with one or more other computing devices. Communication subsystem 410 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 400 to send and/or receive messages to and/or from other devices via a network such as the Internet.

Another example provides, at a local agent computing device, a method comprising sending to a remote work scheduling computing device a work context of the local agent computing device, the work context describing a set of work that the local agent is configured to execute, polling a remote work depository for work compatible with the work context, receiving a response from the remote work depository identifying a job within the work context, the job being requested by a computing device other than the remote work scheduling computing device, and executing the job. In such an example, the method alternatively or additionally may comprise, in response to completing the job, sending a status indicating completion of the job to the remote work depository. In such an example, the method alternatively or additionally may comprise, in response to completing the job, sending a result of completing the job to a remote response aggregator. In such an example, executing the job alternatively or additionally may include attempting to validate one or more parameters specified by the job, in response to successfully validating the one or more parameters, executing the job, and, in response to failing to validate the one or more parameters, not executing the job and sending a status indicating failure of the job to the remote work depository. In such an example, the job alternatively or additionally may specify one or more parameters, and instructions for executing the job alternatively or additionally may be stored at the local agent computing device, the instructions specifying how to execute the job using the one or more parameters as input. In such an example, the job alternatively or additionally may be encrypted with a first key of a key pair specific to the work context of the local agent computing device, and executing the job alternatively or additionally may include decrypting the job using a second key of the key pair. In such an example, executing the job alternatively or additionally may include dividing the job into a plurality of subtasks each associated with a different work context, and depositing each subtask in a respective depository for the work context of that subtask. Any or all of the above-described examples may be combined in any suitable manner in various implementations.

Another example provides, at a work scheduling computing device, a method, comprising receiving a work request from a client device, validating the work request to determine that the work request is authorized, and in response to determining that the work request is authorized, encrypting the work request to form a signed work request and depositing the signed work request in a work depository for discovery by an authorized local agent. In such an example, the work request alternatively or additionally may include a security token comprising one or more claims. In such an example, the method alternatively or additionally may comprise receiving a status from the authorized local agent via the work depository indicating completion of the work request, and sending a notification to the client device indicating completion of the work request, the notification including an identifier indicating a location of a result of completion of the work request. In such an example, the authorized local agent alternatively or additionally may be a first local agent, the work depository alternatively or additionally may be a first work depository, and the method alternatively or additionally may comprise receiving a registration request for registration of a second local agent, the registration request including a work context of the second local agent, the work context describing a set of work that the second local agent is configured to execute, and in response to receiving the registration request, establishing a second work depository for work compatible with the work context. In such an example, the work request alternatively or additionally may be a first work request, and the method alternatively or additionally may comprise receiving a second work request for work compatible with the work context, and in response to receiving the second work request, encrypting the second work request to form a signed second work request, and depositing the signed second work request in the second work depository. In such an example, the work context alternatively or additionally may be a second work context, the first work request alternatively or additionally may be encrypted with a first key specific to a first work context, and the second work request alternatively or additionally may be encrypted with a second key specific to the second work context. Any or all of the above-described examples may be combined in any suitable manner in various implementations.

Another example provides a local agent computing device, comprising a processor and memory holding instructions executable by the processor to send to a remote work scheduling computing device a work context of the local agent computing device, the work context describing a set of work that the local agent is configured to execute, poll a remote work depository for work compatible with the work context, receive a response from the work depository identifying a job within the work context, the job being requested by a computing device other than the remote work scheduling computing device, and execute the job. In such an example, the instructions alternatively or additionally may be executable to, in response to completing the job, send a status indicating completion of the job to the remote work depository. In such an example, the instructions alternatively or additionally may be executable to, in response to completing the job, send a result of completing the job to a remote response aggregator. In such an example, the instructions executable to execute the job alternatively or additionally may include instructions executable to attempt to validate one or more parameters specified by the job, in response to successfully validating the one or more parameters, execute the job, and in response to failing to validate the one or more parameters, not execute the job and send a status indicating failure of the job to the remote work depository. In such an example, the job alternatively or additionally may specify one or more parameters, and instructions for executing the job alternatively or additionally may be stored at the local agent computing device, the instructions specifying how to execute the job using the one or more parameters as input. In such an example, the job alternatively or additionally may be encrypted with a first key of a key pair specific to the work context of the local agent computing device, and executing the job alternatively or additionally may include decrypting the job using a second key of the key pair. In such an example, the instructions executable to execute the job alternatively or additionally may include instructions executable to divide the job into a plurality of subtasks each associated with a different work context, and deposit each subtask in a respective depository established for the work context of that subtask for discovery by a downstream local agent computing device configured for the work context of that subtask. Any or all of the above-described examples may be combined in any suitable manner in various implementations.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. At a local agent computing device, a method comprising:
   sending to a remote work scheduling computing device a work context of the local agent computing device, the work context describing a set of work that the local agent is configured to execute;
   sending a polling query to a remote work depository, the polling query querying the remote work depository for work compatible with the work context;
   receiving a response to the polling query from the remote work depository identifying a job within the work context, the job being requested by a computing device other than the remote work scheduling computing device; and
   executing the job.

2. The method of claim 1, further comprising, in response to completing the job, sending a status indicating completion of the job to the remote work depository.

3. The method of claim 1, further comprising, in response to completing the job, sending a result of completing the job to a remote response aggregator.

4. The method of claim 1, wherein executing the job includes:
   attempting to validate one or more parameters specified by the job;
   in response to successfully validating the one or more parameters, executing the job; and in response to failing to validate the one or more parameters, not executing the job and sending a status indicating failure of the job to the remote work depository.

5. The method of claim 1, wherein the job specifies one or more parameters, and wherein instructions for executing the job are stored at the local agent computing device, the instructions specifying how to execute the job using the one or more parameters as input.

6. The method of claim 1, wherein the job is encrypted with a first key of a key pair specific to the work context of the local agent computing device, and wherein executing the job includes decrypting the job using a second key of the key pair.

7. The method of claim 1, wherein executing the job includes dividing the job into a plurality of subtasks each associated with a different work context, and depositing each subtask in a respective depository for the work context of that subtask.

8. At a work scheduling computing device, a method, comprising:
    receiving a work request from a client device;
    validating the work request to determine that the work request is authorized;
    in response to determining that the work request is authorized, encrypting the work request to form a signed work request and depositing the signed work request in a work depository for discovery by an authorized local agent;
    receiving a polling query from the authorized local agent, the polling query polling for work compatible with a work context of the authorized local agent; and
    sending a response to the polling query identifying a job within the work context.

9. The method of claim 8, wherein the work request includes a security token comprising one or more claims, the one or more claims comprising information regarding one or more user properties and/or one or more encryption keys.

10. The method of claim 8, further comprising receiving a status from the authorized local agent via the work depository indicating completion of the work request, and sending a notification to the client device indicating completion of the work request, the notification including an identifier indicating a location of a result of completion of the work request.

11. The method of claim 8, wherein the authorized local agent is a first local agent, and wherein the work depository is a first work depository, the method further comprising receiving a registration request for registration of a second local agent, the registration request including a work context of the second local agent, the work context describing a set of work that the second local agent is configured to execute, and in response to receiving the registration request, establishing a second work depository for work compatible with the work context.

12. The method of claim 11, wherein the work request is a first work request, the method further comprising receiving a second work request for work compatible with the work context, and in response to receiving the second work request, encrypting the second work request to form a signed second work request, and depositing the signed second work request in the second work depository.

13. The method of claim 12, wherein the work context is a second work context, wherein the first work request is encrypted with a first key specific to a first work context, and wherein the second work request is encrypted with a second key specific to the second work context.

14. A local agent computing device, comprising:
    a processor; and
    memory holding instructions executable by the processor to:
        send to a remote work scheduling computing device a work context of the local agent computing device, the work context describing a set of work that the local agent is configured to execute;
        in response to sending the work context, receive a location of a remote work depository;
        send a polling query to the location of the remote work depository, the polling query querying the remote work depository for work compatible with the work context;
        receive a response to the polling query from the remote work depository identifying a job within the work context, the job being requested by a computing device other than the remote work scheduling computing device; and
        execute the job.

15. The computing device of claim 14, wherein the instructions are further executable to, in response to completing the job, send a status indicating completion of the job to the remote work depository.

16. The computing device of claim 14, wherein the instructions are further executable to, in response to completing the job, send a result of completing the job to a remote response aggregator.

17. The computing device of claim 14, wherein the instructions executable to execute the job include instructions executable to:
    attempt to validate one or more parameters specified by the job;
    in response to successfully validating the one or more parameters, execute the job; and
    in response to failing to validate the one or more parameters, not execute the job and send a status indicating failure of the job to the remote work depository.

18. The computing device of claim 14, wherein the job specifies one or more parameters, and wherein instructions for executing the job are stored at the local agent computing device, the instructions specifying how to execute the job using the one or more parameters as input.

19. The computing device of claim 14, wherein the job is encrypted with a first key of a key pair specific to the work context of the local agent computing device, and wherein executing the job includes decrypting the job using a second key of the key pair.

20. The computing device of claim 14, wherein the instructions executable to execute the job include instructions executable to divide the job into a plurality of subtasks each associated with a different work context, and deposit each subtask in a respective depository established for the work context of that subtask for discovery by a downstream local agent computing device configured for the work context of that subtask.

* * * * *